W. F. Ketchum.
Mower.
Nº 8724  Patented Feb. 10, 1852.
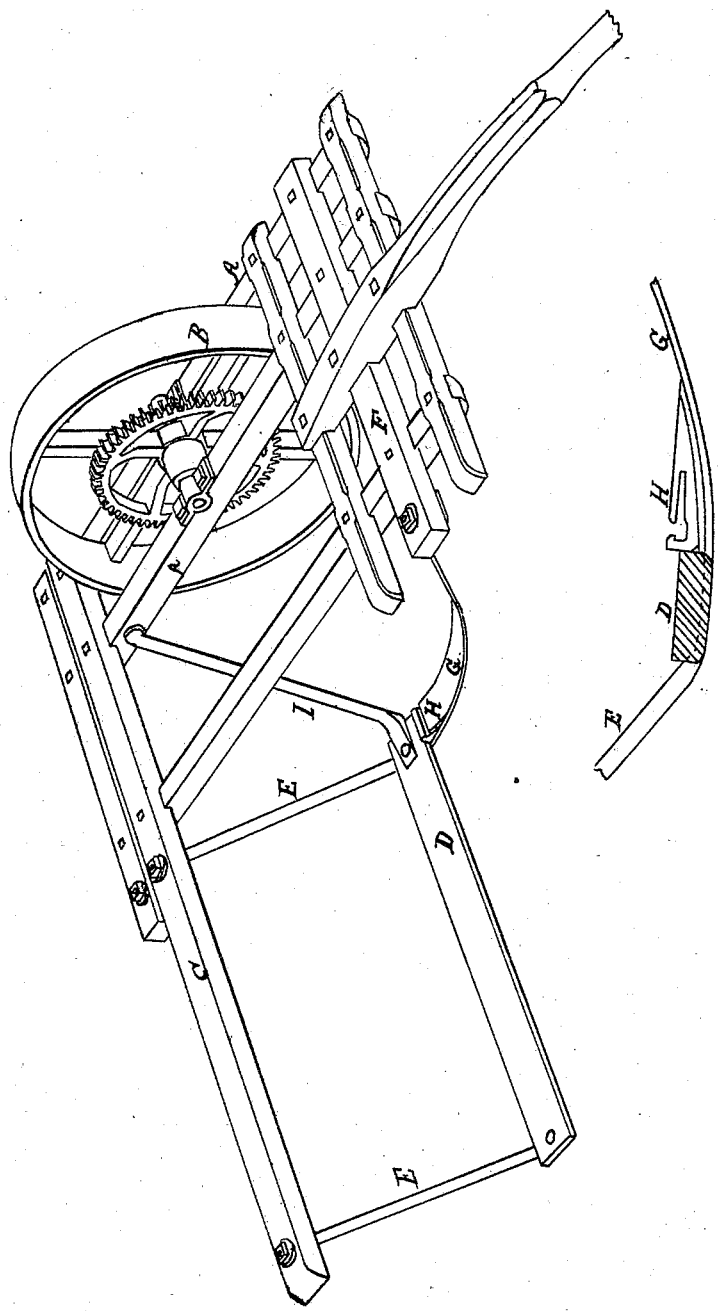

UNITED STATES PATENT OFFICE.

W. F. KETCHUM, OF BUFFALO, NEW YORK.

IMPROVEMENT IN GRASS-HARVESTERS.

Specification forming part of Letters Patent No. 8,724, dated February 10, 1852.

*To all whom it may concern:*

Be it known that I, WILLIAM F. KETCHUM, of Buffalo, in the county of Erie and State of New York, have invented certain new and useful Improvements in the Mowing-Machine for which I obtained Letters Patent of the United States, bearing date the 10th of July, 1847; and I do hereby declare that the following is a full, clear, and exact description of the principle or character which distinguishes it from all other things before known, and of the usual manner of making, modifying, and using the same, reference being had to the accompanying drawing, and letters marked thereon, forming a part of this specification.

It is a fact well known to those who have had practical experience on the subject that machines which will cut grain perfectly cannot be made to mow grass, and I am not aware that any machine has been made practically efficient till the one patented to me in 1847, the principal feature of which was bringing the cutters to or nearly to a plane vertical to the axis of the driving-wheel—in other words, bringing the cutters to a line drawn perpendicular to the face of the wheel from the point where the wheel touches the ground—by which arrangement it will be seen that any vibrating up and down of the ends of the frame occasioned by the movement of the animals drawing the machine will cause little or no deviation in the elevation of the cutters, which would not be the case if the cutters were placed before or behind the wheel.

In my patented machine above named so constructed, upon which this is an important improvement, the cutter-bar or rack-piece D was supported at one end only, and as it must be made very thin and light it was liable to get damaged by striking obstacles, bending, and causing also great friction on the moving cutters. To remedy this difficulty and at the same retain my rack D in the advantageous position before described is the object of the improvement for which I ask Letters Patent on my first claim.

This improvement consists in projecting a stout bar, c, from the frame parallel with but behind and above the rack at a sufficient height to clear the grass, and projecting down from it slim iron braces to said rack D in a line with the course of the machine, so that they will not clog, while they sustain the light cutting-rack as perfectly as in grain-machines where the cutters run high above the ground, and the aprons and other devices can come in play for that purpose.

My second improvement consists in the shield-plate G, projecting up from the shoe H. This is a broad plate that passes over the short stubble or loose grass and treads it down where the end of the cutter-bar is working, so that the grass will not be caught in the moving joint and clog the machine. In the reaping-machine this is not necessary, as that cuts high from the ground, but it is all important in a machine which is dragged over the stubble close to the surface. This shield may also be made an additional brace by bringing it up to the frame in front and bolting it there, as shown in the drawing.

Having thus fully described my improvement, what I claim therein as new, and desire to secure by Letters Patent, is—

1. Sustaining the rack-piece D, in the manner set forth, by projecting a beam, C, from the frame above the grass and behind it, to which it is connected by the rods E, as herein fully set forth, and in combination therewith.

2. The shield-plate G, in connection with the beam C for sustaining the rack-piece D, substantially in the manner and for the purpose above described.

WILLIAM F. KETCHUM.

Witnesses:
J. BECKWITH WEST,
WM. GREENOUGH.